US009663679B2

(12) United States Patent
Cameron et al.

(10) Patent No.: US 9,663,679 B2
(45) Date of Patent: May 30, 2017

(54) CURABLE COATING COMPOSITION

(71) Applicant: AKZO NOBEL COATINGS INTERNATIONAL B.V., Arnhem (NL)

(72) Inventors: Colin Cameron, Northumberland (GB); Michael Leslie Malthouse, Tyne and Wear (GB); Alastair Robert Marrion, Northumberland (GB); Antony Colin Wright, Tyne and Wear (GB); Matthew George Unthank, Tyne and Wear (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/371,872

(22) PCT Filed: Jan. 16, 2013

(86) PCT No.: PCT/EP2013/050688
§ 371 (c)(1),
(2) Date: Jul. 11, 2014

(87) PCT Pub. No.: WO2013/107747
PCT Pub. Date: Jul. 25, 2013

(65) Prior Publication Data
US 2015/0024214 A1 Jan. 22, 2015

Related U.S. Application Data

(60) Provisional application No. 61/590,141, filed on Jan. 24, 2012.

(30) Foreign Application Priority Data

Jan. 19, 2012 (EP) ..................... 12151769

(51) Int. Cl.
*C08G 59/66* (2006.01)
*C08K 5/17* (2006.01)
*C08K 5/18* (2006.01)
*C08K 5/37* (2006.01)
*C08K 5/50* (2006.01)
*C09D 163/00* (2006.01)
*C09D 163/04* (2006.01)
*C08G 59/68* (2006.01)

(52) U.S. Cl.
CPC ........... *C09D 163/04* (2013.01); *C08G 59/66* (2013.01); *C08G 59/686* (2013.01); *C08G 59/688* (2013.01); *C08K 5/17* (2013.01); *C08K 5/18* (2013.01); *C08K 5/37* (2013.01); *C08K 5/50* (2013.01); *C09D 163/00* (2013.01); *Y10T 428/31511* (2015.04)

(58) Field of Classification Search
CPC .... C08G 59/66; C08G 59/686; C08G 59/688; C08K 5/17; C08K 5/18; C08K 5/37; C08K 5/50; C08L 63/00–63/10; C09D 163/00–163/10; C09J 163/00–163/10
See application file for complete search history.

(56) References Cited

U.S. PATENT DOCUMENTS

| 3,553,283 A | 1/1971 | Doss |
| 3,632,654 A * | 1/1972 | Van Auken et al. ............ 568/66 |
| 3,984,456 A | 10/1976 | Guthrie et al. |
| 5,558,937 A * | 9/1996 | Woods et al. ................. 428/378 |
| 6,447,708 B1 * | 9/2002 | Thepot .................. C07C 319/18 264/496 |
| 9,340,717 B2 * | 5/2016 | Matson ................. C07C 319/04 |
| 9,522,975 B2 * | 12/2016 | Matson .................. C08G 75/00 |
| 2004/0157003 A1 | 8/2004 | Baumgart et al. |
| 2012/0035291 A1 * | 2/2012 | Matson ................. C07C 319/04 522/76 |

FOREIGN PATENT DOCUMENTS

| DE | 101 30 972 | 11/2002 |
| EP | 1 477 511 | 11/2004 |
| GB | 1024396 | * 3/1966 |
| GB | 1 352 527 | 5/1974 |

(Continued)

OTHER PUBLICATIONS

Dow DEN 438 Technical Data Sheet (no date).*
Scifinder properties of CAS 3048-64-4 (2016).*
Scifinder properties of 1330-20-7 (2016).*
Machine translation of JP 2005-035968 A.*
International Search Report for Application No. PCT/EP2013/050688, mailed on Feb. 14, 2013.
European Search Report for EP Application No. 12151769.2, dated Apr. 2, 2012.
International Preliminary Report on Patentability for Application No. PCT/EP2013/050688, mailed on Feb. 3, 2014.
ThreeBond Technical News, ThreeBond Co., Ltd., Dec. 20, 1990. p. 1-10.
Japanese Journal of Polymer Science and Technology, 1988, 45(10), p. 755-759, English-language abstract provided.
Office Action received in Japanese Patent Application No. 2014-552598, mailed on Jul. 28, 2015, only English-language translation provided.

*Primary Examiner* — Kregg Brooks
(74) *Attorney, Agent, or Firm* — McDonnell Boehnen Hulbert & Berghoff LLP

(57) ABSTRACT

The present invention relates to a curable coating composition, comprising: (a) a curable coating resin comprising thiol-reactive groups, (b) a thiolated norbornene curing agent for the curable coating resin, the thiolated norbornene curing agent comprising on average at least 1.0 thiol group per molecule, and (c) an accelerator for accelerating the reaction between the thiol reactive-groups on the curable coating resin and the thiol groups on the thiolated norbornene curing agent. These coating compositions can be cured at ambient temperature and provide a coated surface that can be walked on after only a couple of hours. The coating compositions in general have a VOC below 250 g/L. The coating compositions can be used for the protection of large steel structures, such as ships, buildings, bridges, industrial plants, and oil production installations.

15 Claims, No Drawings

(56) References Cited

FOREIGN PATENT DOCUMENTS

| JP | A-H10-060097 | 3/1998 |
|----|--------------|--------|
| JP | A-2005-035968 | 2/2005 |
| JP | A-2010-100704 | 5/2010 |
| WO | 95/00869 | 1/1995 |
| WO | 00/22025 | 4/2000 |
| WO | 2013/107747 | 7/2013 |

* cited by examiner

CURABLE COATING COMPOSITION

REFERENCE TO RELATED APPLICATIONS

This application is the U.S. National Phase of PCT/EP2013/050688, filed on Jan. 16, 2013, and claims the benefit of EP Application No. 12151769.2, filed on Jan. 19, 2012, and U.S. Provisional Application No. 61/590,141, filed on Jan. 24, 2012.

The subject matter of this application was made under a joint research agreement between International Paint Limited and Chevron Phillips Chemical Company LP.

The present invention relates to a curable coating composition. Such compositions generally comprise a resin, a curing agent for the resin and optionally a catalyst for the curing reaction, optionally together with solvents, pigments and fillers and other additives necessary to deliver the desired end-use performance. When such curable coatings compositions are to be stored and used under ambient temperature conditions, it is usually necessary to package the resin and the curing agent separately. By ambient temperature we mean that no artificial heating of the coating is used and the coating cures under the prevailing environmental conditions once it has been applied. The other ingredients can be incorporated as desired in the most appropriate package. The two packages are mixed shortly before the coating is to be applied to a substrate, particularly if rapid curing of the coating is required.

In general, the pot life, that is the time within which the coating increases in viscosity beyond a sprayable consistency, is required to be as long as possible and the time the coating takes to cure on the substrate is required to be as short as possible. In practice, such a spray test is not normally used to determine the pot life, in case the spray equipment is destroyed if the paint sets rapidly during the process. Instead, pot life, is often measured as the time it takes for the reacting coating composition to double in viscosity at the ambient temperature or temperature range of interest Ambient temperature curing coatings are used in particular for coating large structures which cannot conveniently be heated, for example ships, buildings, bridges, industrial plant and oil production installations, both during construction and for subsequent maintenance. The ambient temperature of application of the coating may vary from 0° C. or below to 25° C. or above, according to season and location. There is a need for a coating which can be applied using non-specialist single component equipment and which has a reasonably long pot life such as at least half an hour or more at 25° C. but which will cure on the substrate to the extent that it can be walked on without substantial damage to the coating within a day or less, preferably 8 hours or less, even at 0° C. or below.

In the present application, the pot life is the time it takes for the reacting coating composition to double in viscosity at the ambient temperature (25° C.).

According to a first aspect of the invention, there is provided a curable coating composition comprising:
 (a) a curable coating resin comprising thiol-reactive groups,
 (b) a thiolated norbornene curing agent for curing the curable coating resin, the thiolated norbornene curing agent comprising at least 1.0 thiol group per molecule, and
 (c) an accelerator for accelerating the reaction between the thiol reactive-groups on the curable coating resin and the thiol group(s) on the thiolated norbornene curing agent.

Advantageously, the curable coating composition is capable of having a VOC of less than or equal to 250 g/liter.

The ratio of the number of equivalents of thiol groups of the thiolated norbornene curing agent (b) to the number of equivalents of the thiol-reactive functional groups from the curable coating resin (a) [(b)/(a)] may range from 0.5 to 2.0.

Within the framework of the present application, a "coating resin" is a resin or a mixture of resins that is capable, as such or in combination with the thiolated norbornene curing agent, of forming a continuous film layer when applied to a substrate.

Within the framework of the present application a reference to norbornene is to be taken to refer to the class of compounds which contain a norbornene group. A norbornene group is shown in the diagram below.

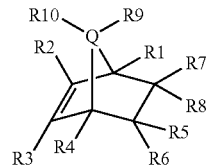

where R1 to R10 may be H, C1 to C10 alkyl (saturated or unsaturated, functional or non-functional), aryl, aralkyl (saturated or unsaturated, functional or non-functional), hydroxyl, carboxyl, aldehyde, amino, or alkylated alkoxysilane. If R6 and R8 (or R5 and R7) do not exist, a norbornadiene results. Q may be carbon, nitrogen or oxygen. When Q=oxygen, R9 and R10 do not exist and when Q=nitrogen, R10 does not exist. For the sake of clarity, the term norbornene is not to be taken as a specific reference to bicyclo [2.2.1]hept-2-ene (which is sometimes referred to as norbornene and results when R1=R2=R3=R4=R5=R6=R7=R8=R9=R10 and Q=carbon). It should be noted that bicyclo[2.2.1]hept-2-ene is a member of the class of norbornenes described above. Within the framework of the present application norbornadienes are regarded as members of the class of norbornenes.

A thiolated norbornene curing agent in accordance with this invention, as further described herein, is to be taken to refer to norbornene which has been thiolated.

Once thiolated, the thiolated norbornene curing agent has only low levels of residual unsaturation in the bicyclic ring of the norbornene, and is substantially saturated as depicted in the diagram below.

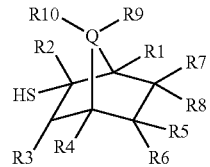

The thiolated norbornene curing agent comprises one (and sometimes two or more) thiolated norbornene groups. The thiolated norbornene curing agent comprises on average more than one thiol group, and on average less than one olefin bond.

An accelerator is a compound or a mixture of compounds which, when added to the curable coating composition or when formed in situ by the chemical interaction of the added accelerator with other components of the curable coating composition during the process of applying and forming the continuous film layer, accelerates the chemical reaction between the coating resin and the thiolated norbornene. The accelerator is used to accelerate the reaction between the thiol reactive-groups on the curable coating resin and the thiol groups on the thiolated norbornene curing agent.

In WO 00/22025, ambient temperature curable coating compositions are disclosed comprising an epoxy resin, a thiol-functional curing agent for the epoxy resin, and a catalyst. In addition, these compositions also comprise a fugitive retarder, which inhibits curing of the composition in the bulk. The use of a fugitive retarder is less desired, since this is normally a volatile liquid organic compound. Thiolated norbornene compounds are not mentioned in this publication In U.S. Pat. No. 3,553,283, curable coating compositions are disclosed comprising an epoxy resin, a thiol-functional curing agent for the epoxy resin, and a catalyst. All the examples of these compositions contain high levels of organic solvent. The use of high levels of solvent is much less desired, and the coating compositions according to this document in general have a VOC of above 250 g/l. For environmental and sustainability reasons, there is a clear need for coatings having a VOC of below 250 g/l. Thiolated norbornene compounds are not mentioned in this publication.

GB 1352527 relates to certain poly(S-glycidyl) compounds, the synthesis thereof, and the use of these poly(S-glycidyl) compounds in various applications, amongst others in paints and lacquers. Thiolated norbornene compounds are not mentioned in this publication.

EP1477511 discloses a curable composition comprising compounds having thiol and ene reactive components. The functionality of each reactive component (the ene and the thiol) must be on average larger than one, and the functionality in total preferably four or higher. The compositions of EP1477511 are designed to enable the ene and thiol reactive components to cross link with each other. In contrast, the thiolated norbornene curing agent of the present invention is not designed to cross-link with itself to form a coating, but with another curable coating resin comprising thiol-reactive groups.

WO95/00869 discloses a UV curable composition comprising a polythiol comprising more than 2 thiol groups per molecule, a dinorbornene terminated polytetramethylene oxide) polymer and a photoinitiator. No mention is made of a thiolated norbornene curing agent in accordance with the invention, the thiolated norbornene curing agent being used to cure another curable coating resin.

It has been found that the coating compositions according to the present invention provide many benefits such as short drying times at low temperatures in a high solids formulation, whilst maintaining an acceptable pot life, good corrosion resistance in unpigmented (and pigmented) coating formulations, good adhesion to steel under immersion, along with an acceptable odour, and low cost.

The coating resin in the composition according to the present invention can be selected from the group comprising olefin resins, unsaturated polyurethane resins, olefin-functional resins, episulphide resins, epoxy resins, oxetane resins, isocyanate resins, alkyd resins, unsaturated polyester resins, unsaturated acrylic resins, resins possessing α,β-unsaturated carbonyl groups, benzoxazine resins, aziridine resins, azetidine resins, alkyne resins, halogen functional resins, thiol functional resins and polysulfide resins containing any of the above functional groups. Mixtures of resins may be used where appropriate, and the term "coating resin" is taken to apply to single resin systems or the mixed resin systems. The coating resin may also comprise compounds which possess the above functional groups, for example, trimethylolpropane triacrylate or pentaerythritol triallyl ether.

In one embodiment, the coating resin is an epoxy resin, a mixture of epoxy resins or a mixture of an epoxy resin or resins with any of the other resins mentioned above. An epoxy resin is a polyepoxy compound containing in general around 2 or more 1,2-epoxy groups per molecule. Such epoxides are described by Y. Tanaka, "Synthesis and Characteristics of Epoxides", in C. A. May, ed., Epoxy Resins Chemistry and Technology (Marcel Dekker, 1988), and also by H Lee and K Neville in "Handbook of Epoxy Resins" (McGraw-Hill, 1967, reissued 1982) and are hereby incorporated by reference. Examples of suitable epoxy resins are a glycidyl ether of a bisphenol such as the diglycidyl ether of bisphenol A, bisphenol F, or bisphenol S, or a condensed or extended glycidyl ether of a bisphenol. Such glycidyl ethers derived from a bisphenol generally have an epoxy functionality of 2 or slightly less, for example, 1.5 to 2. The epoxy resin can alternatively be a glycidyl ether of a polyhydric phenol, for example an epoxy novolac resin, in which case the epoxy functionality is generally greater than 2. The epoxy resin can also be a glycidyl derivative of an amine or an aminophenol, for example diglycidyl aniline, tetraglycidyl meta-xylylenediamine, tetraglycidyl diaminodiphenylmethane, the triglycidyl compound of p-aminophenol or the triglycidyl compound of m-aminophenol. Other examples of epoxy resins that can be cured with the curing agent according to the invention include aliphatic epoxy resins such as hydrogenated bisphenol A epoxy resins and hydrogenated condensed glycidyl ethers of bisphenols, resorcinol diglycidyl ether, polyglycidyl ethers of polyhydric alcohols such as trimethylolpropane triglycidyl ether, pentaerythritol tetraglycidyl ether, dipentaerythritol polyglycidyl ethers, butanediol diglycidyl ether, and hexanediol diglycidyl ether, sorbitol glycidyl ether, epoxidised oils such as vegetable oils or nut oils, epoxy compounds derived from olefins such as diepoxyoctane, epoxidised cylododecatriene and epoxidised polybutadienes. Other epoxides include triglycidyl isocyanurate, glycidyl triazines, and glycidyl carbamates. Epoxidised thiols such as the reaction products of the present thiolated norbornene curing agents with epichlorohydrin, or epoxidised polysulfide resins may also be used. Epoxy functional siloxanes can also be used, such as glycidoxypropyltriethoxy silane, glycidoxypropyltrimethoxy silane and their condensates. Glycidyl esters such as (co) polymers of glycidyl(meth)acrylate, diglycidyl terephthalate, and triglycidyl trimellitate can also be used but are not preferred. When the coating resin is an epoxy resin, it is also possible to incorporate a certain amount of epoxy functional diluents in the resin, if it is necessary to reduce the solvent content of the coating even further. Examples of such epoxy diluents include but is not limited to butyl glycidyl ether, hexyl glycidyl ether, 2-ethyl hexylglycidyl ether, phenyl glycidyl ether, 4-t-butylphenyl glycidyl ether, cresyl glycidyl ether, cardanol glycidyl ether, ethanediol diglycidyl ether, butanediol diglycidyl ether, hexanediol diglycidyl ether, cyclohexane dimethanol diglycidyl ether, neopentylglycol diglycidyl ether, hydrogenated bisphenol A diglycidyl ether and sorbitol polyglycidyl ether.

The coating resin may optionally be supplied as a solution in a suitable solvent.

The coating resin and the curing agent are preferably packaged separately and are mixed shortly before the coating is to be applied to a substrate, allowing rapid curing of the curable coating composition of the present invention under ambient temperature conditions.

The curable coating compositions according to the present invention also comprise an accelerator. The accelerator would normally be packaged with the curing agent of the present invention but this can be varied. A suitable accelerator is an amine compound or mixture of amine compounds, for instance tertiary amines. Suitable tertiary amines include N,N-dimethylaniline, pyridine and its derivatives, quinoline and its derivatives, N,N-dimethylbenzylamine, N,N-diethylbenzylamine, trimethylamine, triethylamine, triisopropylamine, tributylamine, diazabicycooctane (triethylene diamine, DABCO), tetramethylguanidine, cocodimethylamine, N-methylmorpholine, N-methylpiperidine, N,N'-dimethylpiperazine, N-methylpyrrolidine, N,N-dimethylaminopropylamine, N,N-diethylaminopropylamine, 2,4,6-tris(dimethylaminomethyl)phenol, 2,4-bis(dimethylaminomethyl)phenol, 2,6-bis(dimethylaminomethyl)phenol, 2-dimethylaminomethylphenol, 4-dimethylaminomethylphenol, the reaction product of 2,4,6-tris(dimethylaminomethyl)phenol and N,N-dimethylaminopropylamine or N,N-diethylaminopropylamine, N-methyl-imidazole, 2-ethyl-4-methylimidazole, 1,5,7-triazabicyclo[4.4.0]dec-5-ene, 7-methyl-1,5,7-triazabicyclo[4.4.0]dec-5-ene diazabicylcoundecene, sparteine, tris[2-(dimethylamino)ethyl]amine, pentamethyldiethylenetriamine and mixtures thereof, optionally in combination with other amines. Secondary or even primary amines, such as piperidine or m-xylyene diamine can also be used.

Alternatively, a phosphine base, such as triphenyl phosphine or an alcohol can be used as suitable accelerators in the coating composition according to the present invention. Examples of alcohols include benzyl alcohol, or n-butyl alcohol. Aminoalcohols may also be used, such as N,N-dimethylethanolamine, triethanolamine, tri-isopropanolamine, 2-hydroxyethylpiperazine, bis(2-hydroxyethyl)piperazine, or hydroxyethylpiperidine The term accelerator is taken to apply to either a single accelerator system or a mixture of accelerators.

The coating composition of the invention is particularly suitable in situations where heat curing is impractical. For example, it is very suitable as a coating composition for large structures such as ships, buildings, bridges, industrial plants, and oil production installations where it is not possible to apply additional heating of the coating and/or the substrate. The curable composition is suitable for curing at temperatures below 40° C. and particularly below 25° C., or even below 10° C. down to −5° C., −10° C. or even −20° C. The composition generally hardens sufficiently rapidly at 10° C., and usually at 0° C., so that a film of a typical thickness of 100-400 μm can be walked on within 24 hours after application, and usually 8 hours after application without significant damage to the film. Hence, the curable composition is suitable for application and film formation in cold conditions or climates.

The curable coating composition of the invention alternatively can be cured at elevated temperatures, for example temperatures in the range from 40 to 50° C. up to 100 or 130° C., or even higher if extremely rapid curing is desired.

The curable coating composition according to the present invention may have a VOC in the range from 0 to 340 g/l, preferably less in the range from 0 to 250 g/l, even more preferably in the range from 0 to 200 g/l. The VOC of the coating composition may be determined according to EPA Federal Method 24. Where the coating resin is supplied as a solution in a suitable solvent, the amount of solvent which may be added to the curable coating composition may be reduced by the amount present in the coating resin solution, in order to ensure the curable coating composition meets the VOC ranges specified.

The curable coating composition may contain one or more further ingredients, such as one or more pigments. Examples of suitable pigments are titanium dioxide (white pigment), coloured pigments such as yellow iron oxide and red iron oxide, phthalocyanine pigments, reinforcing pigments such as micaceous iron oxide and crystalline silica, anticorrosive pigments such as metallic zinc, zinc phosphate, wollastonite, chromates, molybdates, and phosphonates, and filler pigments such as barytes, talc, and calcium carbonate. The composition may also contain one or more barrier pigments such as glass flake, aluminium flake, or mica, and thickening agents such as fine-particle silica, bentonite clay, hydrogenated castor oil, or a polyamide wax. The composition may also contain one or more plasticisers, pigment dispersants, stabilisers, flow aids, or thinning solvents.

The curable coating compositions according to the present invention can be used as primer coatings and/or finish coating compositions. One aspect of the invention is therefore a primer and/or finish coating composition comprising the components as described herein.

Another aspect of the invention is a (primer and/or finish) coating prepared by applying to a substrate the coating composition comprising the components as described herein to form a curable coating layer, and then curing the curable coating layer to form a coating on the substrate.

These primer coating compositions are particularly suitable for steel surfaces, for example in the construction of bridges, pipelines, industrial plants or buildings, oil and gas installations, or ships, and are preferably cured under ambient temperature conditions. Such primer coating compositions can be used as maintenance and repair coatings on less than perfect surfaces such as aged blasted steel or "ginger" (steel which has been blasted and has started to rust in small spots), hand-prepared weathered steel, and aged coatings. Finish coatings which may be applied over the primer coating compositions include alkyd and other polyester coatings, epoxy coatings, polyurethane coatings, polysiloxane coatings, anti-fouling tie-coat systems, anti-fouling coatings, thermoplastic vinyl coatings, and acrylic coatings. Such finish coatings may be solvent-borne, solvent-free or water-borne.

The finish coating compositions can be applied over various primer coatings, including primers according to the present invention. Other primer coatings include for example inorganic zinc silicate or organic zinc-rich silicate primers and organic, e.g. epoxy resin, primers containing zinc metal, corrosion-inhibiting, metal flake or barrier pigments. The finish coating compositions can also be applied directly over aluminium or zinc "metal spray" coatings, or over galvanised steel, stainless steel, aluminium, or plastic surfaces such as glass fibre reinforced polyester or a polyester gel coat. The curing agent can for example be used in finish coating compositions applied on buildings, steel structures, automobiles, aircraft and other vehicles, and general industrial machinery and fitments. The finish coating composition can be pigmented or it can be a clear (non-pigmented) composition, particularly on cars or yachts. The coating composition can be applied directly to prepared carbon steel as a primer/finish.

The thiolated norbornene curing agent can be prepared by any suitable method. By norbornene we refer to the class of compounds which contain a norbornene group. The term norbornene also means all isomeric forms, including all geometric and stereoisomers, for example 5-exo-vinyl norborn-2-ene.

One method of manufacture is similar to the method described in GB 1352527, wherein the thiolated norbornene compound can be prepared by reacting the parent norbornene compound with a thiol acid of formula R'COSH, wherein R' denotes an aliphatic or aromatic group. After this reaction, the R'CO-groups are replaced by hydrogen in a hydrolysis stage, using any suitable method. One method is described in U.S. Pat. No. 3,984,456 where the thioester product is boiled in water for three hours using an excess of sodium hydroxide. After acidification with hydrochloric acid, the thiol product is isolated by extraction into ether followed by removal of the solvent by distillation. This method can be schematized as follows for the preparation of the thiolated norbornene 2-mercaptoethyl norbornanethiol:

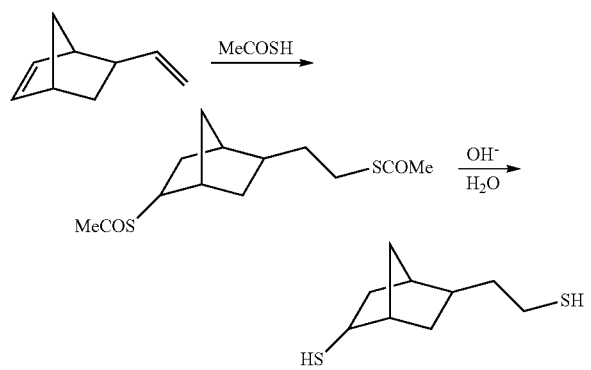

Another method is to use an excess of hydrogen sulfide ($H_2S$) in the presence of a radical initiator. This method can be schematized as follows for the preparation of 1-mercaptoethyl norbornanethiol:

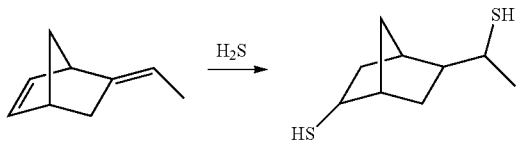

The term "thiolated norbornene" includes all isomeric forms of the material, including all geometric, stereoisomeric and enantiomeric forms, whether racemic or not. The term "mercaptanised norbornene" may also equally be used. Examples of suitable norbornene compounds as a starting material for the preparation of thiolated norbornene compounds include 5-vinyl-norborn-2-ene
5-ethylidene norborn-2-ene These materials can also collectively be known as thiolated vinyl norbornenes or alternatively mercaptanised vinyl norbornenes.

There are many other methods by which unsaturated norbornenes suitable for thiolation can be prepared. For example, a Diels Alder reaction of cyclopentadiene with a multifunctional dienophile such as methylene bisacrylamide, 1,3,5-triacryloylhexahydro-1,3,5-triazine, 1,4-benzoquinone or maleic anhydride would yield suitable norbornenes. Use of furans or functional furans in Diels Alder reactions would also yield oxo-norbornenes suitable for thiolation. Likewise multifunctional acrylates would also yield multifunctional norbornenes.

Because of the reactivity of the norbornene unsaturation, it is possible to react the olefin bond of the norbornene directly with elemental sulfur to yield a trithiolane. Subsequent reduction of the trithiolane would yield a thiolated norbornene as a vicinal dithiol, as follows:

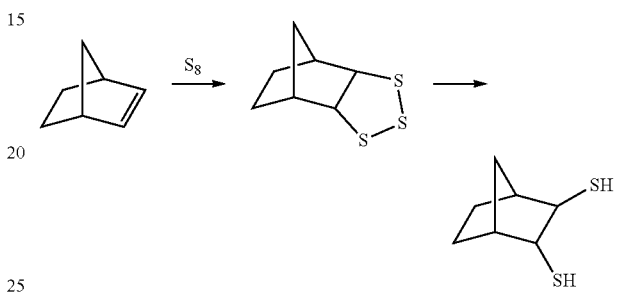

The trithiolane of 5-vinyl-norbornene can be polymerized by conventional techniques to yield a multifunctional trithiolane which may then be reduced to form a more highly functional thiolated norbornene.

Within the framework of the present application, norbornadiene also falls into the class of norbornenes and is itself also readily thiolated by any suitable technique. For example, in the reaction with elemental sulfur, norbornadiene itself would yield a bis(trithiolane) which on reduction would yield a tetrathiol as follows.

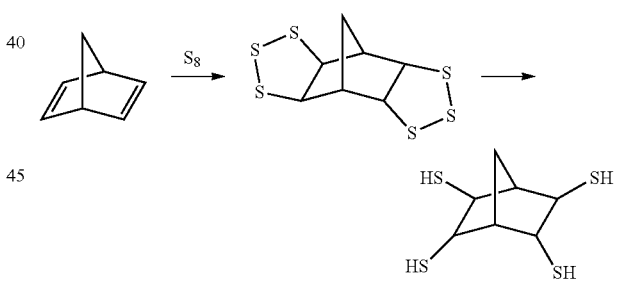

Other norbornene substrates which may be used to form thiolated norbornenes include norbornenes possessing functional groups other than olefinic groups, for example 5-norbornene-2-methanol, 5-norbornene-2,2-dimethanol, 5-norbornene-2-ol, 5-norbornene-2-carboxylic acid, 5-norbornene-2,3-dicarboxylic acid and 5-norbornene-2-carboxaldehyde. All these materials may be reacted through the non-olefinic functional group by any suitable means to form more highly functional norbornenes suitable for thiolation to form thiolated norbornene curing agents.

It is believed that, depending on the reaction conditions and the molar ratio of the thiolating agent to the norbornene compound, the obtained thiolated norbornene can have an average thiol functionality of more than one per molecule, preferably around two per molecule or more, depending on the number of thiolatable groups present on the norbornene compound.

The thiolated norbornene curing agent contains on average (mean number average) at least 1.0 thiol group per molecule, preferably more than 1.0, much closer to 2.0 thiol groups per molecule (e.g. 1.5 to 2.5 thiol groups per molecule or 1.8 to 2.2 thiol groups per molecule).

Without wishing to be bound by theory, this average value arises from the curing agent as a mixture of non-thiol functional compounds, monothiol compounds and all the many possible isomers which can be formed during the reaction, e.g. dithiol/trithiol functional compounds or compounds having higher functionality. The average thiol functionality is the ratio of the average molecular weight of the curing agent to the thiol equivalent weight.

To ensure that the thiolated norbornene curing agent has an average thiol functionality of more than 1.0, and an average olefin functionality of less than 1.0, an excess of the thiolating agent over the total unsaturation present is reacted with the norbornene in a first step, and then the final product is isolated by removing the excess thiolating agent by any appropriate method.

Surprisingly, it was found that compositions of thiolated norbornene curing agents such as those given above, whilst possessing a typical mercaptan type odour, this odour is less powerful than other mercaptans of similar molecular weight. The odour of the coating compositions containing the curing agent is not so strong as to preclude the use of the material in an open, unextracted area such as might be found in a fabrication shop or a shipyard.

If higher molecular weight thiolated norbornene curing agents are required, one method by which they may be made is by selecting an appropriate ratio of the norbornene and whatever agent and reaction conditions are employed to carry out the thiolation of the norbornene, and allowing a certain degree of oligomerisation to occur. Such higher molecular weight thiolated norbornenes are likely to possess a reduced odour.

Alternatively higher molecular weight thiolated norbornene curing agents may be made by adduction with any compound which can react with the thiol groups of the thiolated norbornene curing agent. Such compounds will have the same functional groups as those in the list of coatings resins given above. Whilst it is possible to adduct the thiolated norbornene with a compound bearing only 1 functional group and obtain a higher molecular weight thiolated norbornene curing agent, such an adduction will have the effect of reducing the thiol functionality of the curing agent. Whilst monofunctional adducting compounds are not precluded, it is preferable that the adducting compound possesses more than 1 functional group capable of reaction with the thiol groups of the thiolated norbornene. Reacting such a multifunctional compound with the thiolated norbornene curing agent will not only increase the molecular weight, but may also increase the average number of functional groups per molecule depending on the functionality of the adducting compound and the functionality of the thiolated norbornene employed. For example the compound may be a difunctional olefin such as divinyl benzene, di-isopropenylbenzene, vinyl norbornene, vinyl cyclohexene, octadiene, cyclooctadiene, trimethylopropane diallyl ether or any other suitable diolefin. Blends of diolefins with monoolefins can be used as long as the amount of monoolefin is not too great. For example commercial divinyl benzene is supplied with around 20% by weight of ethyl vinyl benzene, and this mixture of compounds leads to satisfactory adducts. Alternatively the compound may be a difunctional epoxy resin such as those examples listed above. A diisocyanate compound such as isophorone diisocyanate, hexamethylene diisocyanate or toluene diisocyanate may be used. The reaction conditions for the production of these adducted curing agents will depend on the nature of the compound functional groups. For olefins a free radical process initiated by an azo or peroxy compound, such as azo-bisisobutyronitrile, 2,2'-azobis(2-methylbutyronitrile) or di-tert-butyl peroxide, would be suitable. For epoxy compounds, simple heating of the components should be sufficient. Likewise with an isocyanate. Accelerators for the various adduction reactions of course may be optionally used. In general a thiolated norbornene with on average around two thiol groups per molecule on adduction with a difunctional reagent will lead to a new thiolated norbornene with no change in the average functionality.

In general, if the coating resin has a high functionality, for example an epoxidised novolac resin, the functionality of the thiolated norbornene curing agent can be lower, and still form an adequate polymer network.

In some circumstances it may be desirable to mix the curing agents of the present invention with other curing agents for the coating resin selected where such a blending would give rise to enhancements in one or more properties of the curable coating composition. For example in the case of epoxy coating resins, it may be advantageous to mix the thiolated norbornene curing agent with a conventional amine curing agent such as those described by C Hare in "Protective Coatings: Fundamentals of Chemistry and Composition" (SSPC, 1994), by W Ashcroft in "Chemistry and Technology of Epoxy Resins", Ed. B Ellis (Blackie 1993), by T S Mika and R S Bauer in C. A. May, ed., Epoxy Resins Chemistry and Technology (Marcel Dekker, 1988), and also by H Lee and K Neville in "Handbook of Epoxy Resins" (McGraw-Hill, 1967, reissued 1982) and are all hereby incorporated by reference. Mixtures of the thiolated norbornene curing agent with other thiol materials, such as pentaerythritol tetramercaptopropionate available from Bruno Bock, or KarenzMT PE-1 available from Showa Denko may also be desirable, again where such a blending would give rise to enhancements in one or more properties of the curable coating composition.

It is well known to those versed in the art that combining a good cure rate or coating drying speed with a pot life appropriate for coating application by conventional airless spray gun, especially in a formulation low in solvent content, is problematic. Often such reactive coatings have to be applied by twin-feed or plural component application technology. It has been surprisingly found that with the thiolated norbornenes of the present invention that a good balance of pot life with an acceptable cure rate can be obtained in epoxy resin-thiol curing compositions by the proper selection of the right accelerator.

By judicious choice of the epoxy compound, the accelerator and the reaction conditions, a pot life suitable for coating application by conventional airless spray can be obtained, whilst still maintaining a good cure rate.

The amounts of coating resin, curing agent and accelerator used in the curable coating compositions of the present invention will vary depending on the equivalent weight of the particular coating resin used, the equivalent weight of the curing agent, the desired stoichiometry of the curing reaction, the desired pot life, the desired cure rate and final end-use performance properties desired. The stoichiometry is defined as the ratio of the number of equivalents of thiol groups from the thiolated norbornene curing agent (b) to the number of equivalents of the thiol-reactive functional groups from the curable coating resin (a). The stoichiometry ((b)/(a)) will generally be in the range 0.3 to 2.0, more preferably 0.5-2.0, more preferably 0.5 to 1.5, even more preferably 0.6 to 1.2, most preferably in the range 0.7 to 1.0. In those cases where blends of thiol curing agents are used or a blend of a thiolated norbornene with a conventional amine curing agent, the number of equivalents of thiol groups from the mixture of thiols, or the number of equivalents of thiol groups plus the number of equivalents of active hydrogen atoms from the amine curing agent employed must be taken into account when calculating the stoichiometry.

In one embodiment, for an anti-corrosive primer based on an epoxy coating resin of equivalent weight range of 170 to 190 g/mole (based on the solvent free coating resin) and ignoring all other ingredients such pigments, fillers, solvents and other additives, the coating composition according to the present invention most preferably comprises from 30 to 80 wt. % of the coating resin
from 20 to 70 wt. % of a thiolated norbornene curing agent, and
from 0 to 4 wt. % of an accelerator.

The invention will now be elucidated with reference to the following examples. These are intended to illustrate the invention but are not to be construed as limiting in any manner the scope thereof.

EXAMPLES

Example 1

A model epoxy formulation designed to mimic the reactivity of an unpigmented epoxy coating composition according to the present invention was prepared comprising
70.1 wt. % of an epoxy novolac resin (EPN1180X80 available from Huntsman),
29.5 wt. % of 2-Mercaptoethyl Norbornanethiol, and
0.4 wt. % of tertiary amine (Ancamine K54).
(the wt. % were calculated on the total weight of the composition).

Using a 300 μm draw down bar, the mixed coating was applied to 6×4 inch 2 mm thick mild steel panels which had been grit blasted to an SA2½ standard. The coated panels were placed in an incubator set at 0° C. and 50% relative humidity (RH). The coatings were hard dry within 8 hours at 0° C. After 24 hours had elapsed, a second coat was applied to the first coat and the paint allowed to stand a further 24 hours at 0° C. The films were again hard dry after 8 hours at 0° C. as desired. Film integrity and hardness were good. The coated panels were placed in fresh water at room temperature and 30° C. After 4 weeks there was no visible sign of any corrosion on either panel. Likewise, the adhesion to steel after exposure to salt water for 4 weeks was good.

Example 2

A model epoxy formulation designed to mimic the reactivity of an unpigmented coating composition according to the present invention was prepared at low temperature (≤10° C.) comprising
60.0 wt. % of 3-phenoxy-1,2-epoxypropane,
38.7 wt. % of 2-Mercaptoethyl Norbornanethiol,
1.3 wt. % of 2,4,6-tris(dimethylaminomethyl)phenol.
(the wt. % were calculated on the total weight of the composition).

This composition was placed in a temperature controlled environmental chamber held at 10±1° C. The viscosity remained unchanged over the first hour The reaction was complete within 10 hours at 10° C.

This composition had a good pot life (>1 hr) and also a relatively short reaction time.

Example 3

A model epoxy formulation designed to mimic the reactivity of an unpigmented coating composition according to the present invention was prepared at low temperature (≤10° C.) comprising
60.8 wt. % of 3-phenoxy-1,2-epoxypropane,
38.0 wt. % of 2-Mercaptoethyl Norbornanethiol,
1.2 wt. % of triphenylphosphine.
(the wt. % were calculated on the total weight of the composition).

This composition was placed in a temperature controlled environmental chamber held at 10±1° C. The reaction was complete within 20 hours at 10° C. and the viscosity remained unchanged over the first few hours.

This composition had an excellent pot life and surprisingly also a relatively short reaction time in sub-ambient conditions (10° C.).

Example 4

A coating composition was prepared from two components A and B as follows:

| Composition Component A | Wt. % based on total weight of component A |
| --- | --- |
| Epoxy novolac resin (EPN1180X80) | 52.6 |
| Xylene | 0.3 |
| Talc | 30.4 |
| Polyamide wax thixotrope | 1.0 |
| Non-leafing aluminium paste | 15.7 |

| Composition Component B | Wt. % based on total weight of component B |
| --- | --- |
| 2-Mercaptoethyl Norbornanethiol | 96.3 |
| Tertiary amine (Ancamine K54). | 3.7 |

Component A and Component B were mixed at 25° C. at a weight ratio of 4.3:1 and a coating composition was obtained having:
volume solids of 80%,
weight solids of 87.0%, and
a volatile organic content (VOC) of 173.9 g/liter.

The viscosity of this mixture was then measured at 23° C. as a function of time using a cone and plate viscometer in order to obtain a measure of the pot life of the mixed paint. The viscosity only started to rise after 80 minutes.

These results show that good pot life can be maintained even in a high solids epoxy-thiol formulation using the thiolated norbornenes of the present invention.

The drying time of the coating at 0° C. was measured using a BK dry track recorder. The coating was through dry within 6½ to 7 hours.

This data demonstrates that the high solids coating composition using the thiolated norbornene curing agent, also surprisingly had a long pot life and a rapid drying time.

The invention claimed is:
1. A curable coating composition comprising:
(a) a curable coating resin comprising thiol-reactive groups,
(b) a thiolated norbornene curing agent for the curable coating resin, the thiolated norbornene curing agent comprising on average at least 1.0 thiol group per molecule, and wherein the thiolated norbornene curing agent is thiolated 5-vinyl-norborn-2-ene or thiolated 5-ethylidene norborn-2-ene, and (c) an accelerator for accelerating the reaction between the thiol-reactive groups on the curable coating resin and the thiol group(s) on the thiolated norbornene curing agent, wherein the composition is curable in the temperature range from −20° C. to 50° C.

2. The curable coating composition according to claim 1, wherein the thiolated norbornene curing agent comprises on average 1.5-2.5 thiol groups per molecule.

3. The curable coating composition according to claim 1, wherein the curable coating resin is an epoxy resin or an epoxy resin solution.

4. The curable coating composition according to claim 3, wherein the accelerator is a tertiary amine, an alcohol or a phosphine base.

5. The curable coating composition according to claim 4, wherein the coating composition has a pot life of at least 30 minutes at 25° C.

6. The curable coating composition according to claim 1, wherein the accelerator is a tertiary amine, an alcohol or a phosphine base.

7. The curable coating composition according to claim 6, wherein the coating composition has a pot life of at least 30 minutes at 25° C.

8. The curable coating composition according to claim 6, wherein the curable coating composition has a VOC of less than or equal to 250 g/liter.

9. The curable coating composition according to claim 1, wherein the curable coating composition has a VOC of less than or equal to 250 g/liter.

10. The curable coating composition according to claim 9, wherein the curable coating composition has a dry time at 0° C. of less than 10 hours.

11. The curable coating composition according to claim 1, wherein the curable coating composition has a dry time at 0° C. of less than 10 hours.

12. The curable coating composition according to claim 1, wherein the ratio of the number of equivalents of thiol groups of the thiolated norbornene curing agent to the number of equivalents of the thiol-reactive functional groups from the curable coating resin ((b)/(a)) ranges from 0.5 to 2.0.

13. A method of coating a substrate comprising applying to the substrate the curable coating composition as defined in claim 1 and curing the curable coating composition to form a coating on the substrate.

14. A substrate coated with the curable coating composition according to claim 1.

15. An curable coating composition comprising:

(a) from 30 to 80 wt. % of a curable coating resin comprising thiol-reactive groups, (b) from 20 to 70 wt. % of a thiolated norbornene curing agent comprising on average at least 1.0 thiol group per molecule, wherein the thiolated norbornene curing agent is thiolated 5-vinyl-norborn-2-ene or thiolated 5-ethylidene norborn-2-ene, and (c) from 0 to 4 wt. % of an accelerator for accelerating the reaction between the thiol reactive groups on the curable coating resin and the thiol group(s) on the thiolated norbornene curing agent, wherein all wt % are based on the total weight of the coating resin, the thiolated norbornene curing agent, and the accelerator present in the curable coating composition.

* * * * *